United States Patent [19]

Habas

[11] 3,754,614
[45] Aug. 28, 1973

[54] VEHICLE BODY COMPARTMENT PANEL MOUNTING ARRANGEMENT

[75] Inventor: Ted C. Habas, Warren, Mich.

[73] Assignee: General Motors Corporation, Detroit, Mich.

[22] Filed: Dec. 2, 1971

[21] Appl. No.: 204,157

[52] U.S. Cl. ............... 180/69 C, 16/128.1, 16/179, 49/257, 296/76
[51] Int. Cl. .......................................... B62d 25/10
[58] Field of Search ..................... 180/69; 296/76; 16/128.1, 179; 49/257

[56] References Cited
UNITED STATES PATENTS
3,225,856 12/1965 Caramanna ..................... 180/69 C FOREIGN PATENTS OR APPLICATIONS
622,046 4/1949 Great Britain .................... 180/69 C

*Primary Examiner*—Benjamin Hersh
*Assistant Examiner*—Milton L. Smith
*Attorney*—Herbert Furman et al.

[57] ABSTRACT

A mounting arrangement for a vehicle body compartment panel includes suitable panel and vehicle body mounted members slidably mounting the rear end of the panel adjacent the rear ends of a generally upwardly oriented compartment opening of the vehicle body. The front end of the panel is pivoted transversely of the vehicle body to the front ends of a pair of channel members extending generally longitudinally of the vehicle body and including forward and rearward generally horizontal portions connected by intermediate portions extending downwardly to the rear. Front and rear vehicle body mounted rollers are respectively received within the forward and rearward portions of the channel members to support the front end of the panel during forward translational movement from a closed position as locking elements that prevent upward opening panel movement from closed position are slidingly disengaged. The front rollers are received within the intermediate portions of the channel members and lift the front ends of the channel members and panel as they continue to bodily shift forwardly, while the rear rollers pass through abruptly curved portions of the channel members to selectively prevent rearward channel member movement when the panel reaches a partially open position. The pivotal connection of the panel to the front ends of the channel members is located above the adjacent confines of the vehicle body when the panel is in the partially open position and the panel is pivotally movable about this connection between the partially open position and a fully open position allowing access to the compartment opening.

5 Claims, 4 Drawing Figures

Patented Aug. 28, 1973

3,754,614

INVENTOR.
Ted C. Habas
BY
Herbert Furman
ATTORNEY.

VEHICLE BODY COMPARTMENT PANEL MOUNTING ARRANGEMENT

BACKGROUND OF THE INVENTION

This invention relates generally to mounting arrangements for vehicle body compartment panels and, more particularly, to such mounting arrangements that support the panels for generally translatory movement between closed and partially open positions and for generally pivotal movement between the partially open positions and fully open positions.

It is known to provide a mounting arrangement supporting a vehicle body compartment panel for generally horizontal translatory movement between a closed position and a partially open position relative to a compartment opening of the vehicle body and for pivotal movement between the partially open position and a fully open position about an axis passing through the confines of the vehicle body. The translatory movement of the panel from the partially open position to the closed position is useful in that it allows sliding engagement of panel and vehicle body mounted locking elements to prevent upward opening movement of the closed panel. The pivotal panel movement from the partially open position to the fully open position is limited in certain of these mounting arrangements by the vehicle body geometrical restraints. During pivotal movement of the panel to the fully open position in one type of such a mounting arrangement, the main portion of the panel moves upwardly about the pivotal axis and out of the vehicle body confines while a portion of the panel on the opposite side of the pivotal axis moves downwardly. Since this downward moving panel portion will necessarily limit opening movement upon engagement with a fixed member of the vehicle body or will limit the usable space of the compartment if it moves downwardly through the compartment opening, the prior art teaches the concept of positioning the pivotal axis to pass through the vehicle body confines adjacent the end of the vehicle body. This positioning allows the downwardly moving panel portion to essentially tip over the end of the vehicle body. The panel thus necessarily limits access to the end of the vehicle body when positioned in the fully open position.

The United States patent application of Ronald Chupick Ser. No. 182,005, filed on Sept. 20, 1971 and assigned to the assignee of the present invention, discloses a vehicle body compartment panel mounting arrangement in which the pivotal axis of panel movement between the partially open position and the fully open position is located above the adjacent confines of the vehicle body. This positioning prevents opening panel movement from being limited by a downwardly moving panel portion engaging the vehicle body and also prevents the downwardly moving panel portion from limiting the usable space of the compartment. The forward end of the panel is supported for this movement by a pair of gooseneck links with first ends pivoted to the vehicle body to bodily fix the links for movement between first and second positions. The second links ends are pivoted to the compartment panel which is in the closed position when the links are in the first position and is in the partially open position when the links are in the second position. During the movement of the links from the second position to the first position, the panel translates generally rearwardly to slidingly engage locking elements that prevent upward opening panel movement. Since the first ends of the links are bodily fixed relative to the vehicle body, the amount of sliding engagement of these locking elements is somewhat limited in that the panel also moves slightly upwardly during the initial generally translatory movement toward the partially open position.

SUMMARY OF THE INVENTION

This invention provides a mounting arrangement for a vehicle body compartment panel whose forward end is pivoted to the forward end of a support member mounted for bodily shifting movement longitudinally of the vehicle body during translation of the panel between closed and partially open positions and supporting the panel for pivotal movement to a fully open position relative to a compartment opening about an axis located above the adjacent confines of the vehicle body.

In the preferred embodiment of the invention, the support member has the shape of an elongated channel member extending longitudinally of the vehicle body and including generally horizontal forward and rearward portions connected by an intermediate portion that extends downwardly and rearwardly from the forward portion to the rearward portion. Front and rear vehicle body mounted rollers are respectively received within the forward and rearward portions of the channel member and support the front end of the panel for forward generally translatory movement to slidingly disengage locking elements that prevent upward movement of the panel from closed position. As the channel member and panel continue to bodily shift forwardly, the front roller is received within the intermediate portion of the channel member and raises the front ends of the channel member and the panel, while the rear roller passes through an abruptly curved portion of the channel member to prevent rearward channel member movement and movement of the panel rearwardly from the partially open position. The pivotal connection between the channel member and the panel is located above the adjacent confines of the vehicle body when the panel is in the partially open position and the panel is pivotal about this connection to a fully open position allowing access to the compartment opening.

Accordingly, one feature of this invention is that it provides a mounting arrangement for a vehicle body compartment panel whose forward end is pivoted to the forward end of an elongated support member mounted for bodily shifting movement longitudinally of the vehicle body during translation of the panel between closed and partially open positions and supporting the panel for pivotal movement to a fully open position relative to a compartment opening about an axis located above the adjacent confines of the vehicle body. Another feature of the invention is that the support member has the shape of an elongated channel member receiving longitudinally spaced vehicle body mounted rollers to mount the channel member for the bodily shifting longitudinal movement during the translation of the panel. Another feature of the invention is that the channel member includes generally horizontal forward and rearward portions connected by an intermediate portion that extends downwardly and rearwardly from the forward portion to the rearward portion such that the panel translates during the movement of front and rear rollers within the forward and rearward portions, while the front ends of the panel and the channel member move up and down when the front roller moves within the intermediate portion of the channel member. Another feature of the invention is that vehicle body and panel mounted locking elements are slidingly engaged and disengaged as the rollers move within the forward and rearward portions of the channel member. Another feature of the invention is that one of the rollers passes through an abruptly curved portion of the channel member just prior to the panel reaching the partially open position to selectively prevent rearward movement of the channel member and consequent rearward movement of the panel from the partially open position.

BRIEF DESCRIPTION OF THE DRAWINGS

An understanding of the present invention is readily possible from the following description of the preferred embodiment and the drawings in which.

DESCRIPTION OF THE PREFERRED EMBODIMENT

Figure 1:
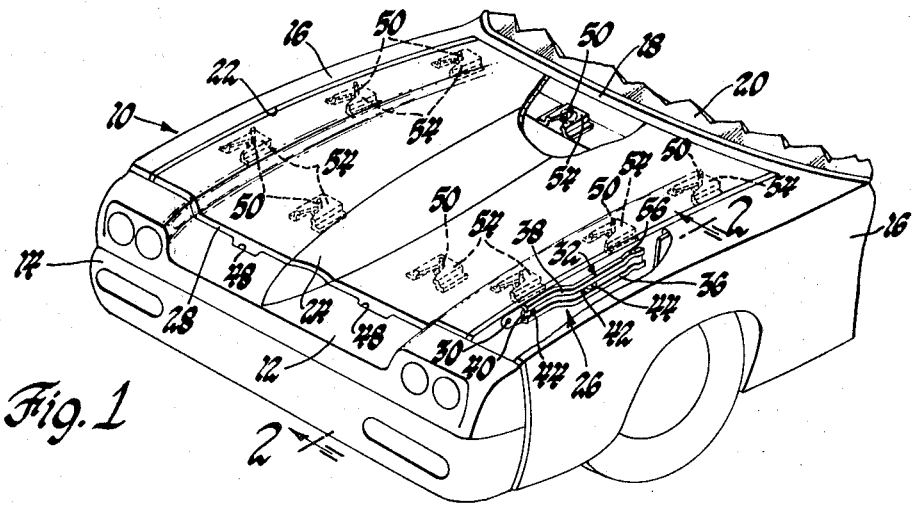
FIG. 1 is a perspective view of the forward portion of a vehicle body partially broken away to show a mounting arrangement, according to this invention, for supporting a compartment panel for generally translatory movement between closed and partially open positions and for pivotal movement between the partially open position and a fully open position.

Referring to FIG. 1 of the drawings, a vehicle body generally indicated by 10 includes a panel 12 that extends laterally of the vehicle body rearward and above a front bumper 14. Front fenders 16 extend rearwardly from the opposite ends of panel 12 at the left and right-hand sides of the vehicle body and a cowl panel 18 extends between the rearward ends of the front fenders just forward of the vehicle windshield 20. Panel 12, fenders 16, and cowl panel 18 cooperatively define a generally upwardly oriented compartment opening 22. A deck lid or compartment panel 24 selectively closes the compartment opening 22 and has its rearward end supported adjacent the rear end of the compartment opening by suitable panel and body mounted slide members for longitudinal movement relative to the vehicle body in a manner to be described. The forward end of panel 24 is supported on each lateral side by a respective mounting arrangement 26, according to this invention, with only the left-hand arrangement shown and described.

Figure 2:
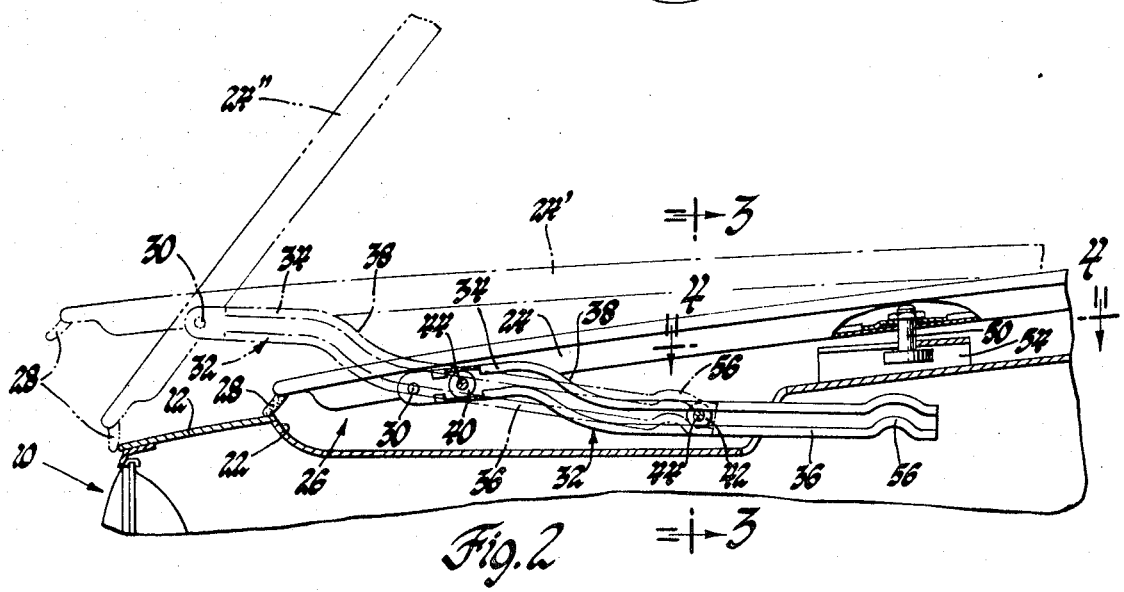
FIG. 2 is an enlarged sectional view taken generally along line 2—2 of FIG. 1 and shows the compartment panel in a solid line indicated closed position, a forwardly translated phantom line indicated partially open position, and an upwardly pivoted phantom line indicated fully open position.
Figure 3:
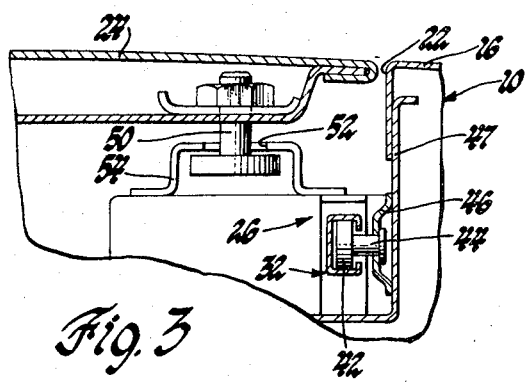
FIG. 3 is an enlarged sectional view taken generally along line 3—3 of FIG. 2.

Referring additionally now to FIG. 2, panel 24 is shown in a solid line indicated closed position where a conventional flexible seal 28 along the forward edge of the panel engages the rear edge of panel 12 to seal the front edge of the compartment opening. A pin 30 is suitably supported by panel 4 extending transversely of the vehicle body slightly rearward of seal 28 and pivotally connects the panel to the forward end of a channel member generally indicated by 32 and comprising a part of the mounting arrangement 26. Channel member 32 includes generally horizontal forward and rearward portions 34 and 36 connected by an intermediate portion 38 that extends downwardly and rearwardly from the forward portion to the rearward portion. When the compartment panel 24 is in the closed position, front and rear rollers 40 and 42 are received by the channel member just rearward of pin 30 in the forward portion 34 and in the rearward portion 36, respectively. Rollers 40 and 42 are supported by vehicle body mounted pins 44 and FIG. 3 shows the manner in which pins 44 are supported on brackets 46 suitably secured to a panel 47 extending downwardly from fender 16. A suitable vehicle body mounted latch mechanism, not shown, includes a bolt selectively engageable with a compartment panel mounted keeper to maintain the compartment panel in closed position.

Figure 4:
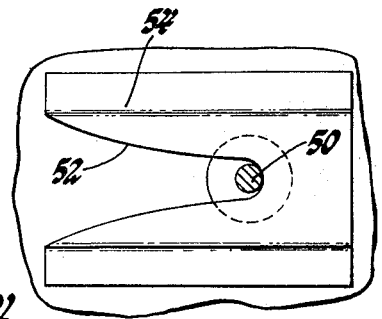
FIG. 4 is an enlarged view taken generally along line 4—4 of FIG. 2 and shows locking elements that are slidingly engaged and disengaged during the translation of the panel between the partially open position and the closed position to prevent upward panel movement from closed position.

When the compartment panel 24 is in closed position, actuation of the latch mechanism disengages the bolt from the panel mounted keeper and manual engagement of the forward edge of the compartment panel adjacent depressions 48 in the rear end of panel 12 allows forward movement of the panel. During the initial forward panel movement, the forward and rearward portions 34 and 36 of channel member 32 move along rollers 40 and 42, respectively, such that the compartment panel moves forwardly in a generally translatory manner. During the forward translation of the compartment panel, a compartment panel mounted pin 50 with a headed free end moves out of a slot 52 in a vehicle body mounted bracket 54, see FIG. 4. Engagement of the head of pin 50 with the bracket 54 prevents upward movement of the compartment panel from closed position, while the forward panel translation and disengagement of the pin and bracket allows such upward opening movement as will be described. During continued forward movement of compartment panel 24, the intermediate portion 38 of channel member 32 receives the front roller 40 to lift the front ends of both the channel member 32 and the compartment panel 24. Just prior to the compartment panel reaching the phantom line indicated partially open position 24', the rear roller 42 rides over an abruptly curved portion 56 of channel member 32, momentarily lifting the front end of channel member 32 slightly higher than the phantom line indicated FIG. 2 position as the channel member pivots intermediate its ends about roller 40. The bias of gravity thus causes the roller 42 and curved portion 56 to selectively prevent rearward channel member movement and movement of the compartment panel rearward from the partially open position where pin 30 is located above the adjacent confines of the vehicle body defined by panel 12. The compartment panel is pivotable upwardly from the partially open position to the phantom line indicated fully open position 24" of FIG. 2 where compartment opening 22 is readily accessible. During the opening panel movement, the forward edge of compartment panel 24 moves downwardly in front of pin 30 and is unobstructed by any vehicle body portion due to the positioning of pin 30 above panel 12. A suitable hold-open mechanism such as a rod selectively extending between the vehicle body and the compartment panel in a conventional manner selectively holds the compartment panel in the fully open position.

From the fully open position, the compartment panel is pivotal to the partially open position and moved rearwardly by first lifting the front edge to move channel member 32 generally clockwise about roller 40 as the roller 42 moves forward of the curved portion 56. Further rearward panel movement returns the compartment panel to closed position in a reverse manner to the opening movement previously described. When the compartment panel reaches the closed position, the bolt of the vehicle body mounted latch mechanism engages the panel mounted keeper to selectively prevent forward panel movement while the interengagement of headed pin 50 and bracket 54 prevents upwardly opening panel movement.

The invention thus provides an improved mounting arrangement for a vehicle body compartment panel.

What is claimed is:

1. In combination with a vehicle body including a generally upwardly oriented compartment opening and a closure member therefor, a mounting arrangement for the closure member comprising:
   means slidably mounting the rear end of the closure member on the vehicle body adjacent the rear end of the compartment opening;
   an elongated support member extending generally longitudinally of the vehicle body with the forward end thereof pivoted to the forward end of the closure member transversely of the vehicle body; and
   vehicle body mounted means slidably mounting the support member for bodily shifting movement longitudinally of the vehicle body between a rearward position where the closure member is in a closed position relative to the compartment opening and a forward position where the closure member is in a generally forwardly translated partially open position with the pivotal connection to the closure member located above the adjacent confines of the vehicle body and with the closure member located generally within the horizontal confines of the vehicle body, the closure member being movable between the partially open position and a fully open position about the pivotal connection to the support member to selectively allow access to the compartment opening, and the closure member being located generally above the adjacent upper vehicle body confines and within the horizontal vehicle body confines while in the fully open position so that the horizontal portions of the vehicle defining these horizontal confines are accessible with the closure member in this position.

2. In combination with a vehicle body including a generally upwardly oriented compartment opening and a closure member therefor, a mounting arrangement for the closure member comprising:
   means slidably mounting the rear end of the closure member on the vehicle body adjacent the rear end of the compartment opening;
   an elongated channel member extending generally longitudinally of the vehicle body with the forward end thereof pivoted to the forward end of the closure member transversely of the vehicle body; and
   vehicle body mounted roller means received within the channel member and supporting the channel member for bodily shifting movement longitudinally of the vehicle body between a rearward position where the closure member is in a closed position relative to the compartment opening and a forward position where the closure member is in a generally forwardly translated partially open position with the pivotal connection to the support member located above the adjacent confines of the vehicle body, the closure member being movable between the partially open position and a fully open position about the pivotal connection to the support member to selectively allow access to the compartment opening.

3. In combination with a vehicle body including a generally upwardly oriented compartment opening and a closure member therefor, a mounting arrangement for the closure member comprising:
   means slidably mounting the rear end of the closure member on the vehicle body adjacent the rear end of the compartment opening;
   an elongated channel member including a forward portion pivoted to the forward end of the closure member transversely of the vehicle body and extending rearwardly from the pivotal connection generally longitudinally of the vehicle body, an intermediate portion extending downwardly and rearwardly from the forward portion, and a rearward portion extending rearwardly from the intermediate portion generally longitudinally of the vehicle body; and
   front and rear body mounted roller means respectively received within the forward and rearward portions of the channel member to support the channel member for bodily shifting movement longitudinally of the vehicle body as the closure member moves in a generally translatory manner between a closed position relative to the compartment opening and a second position forward thereof, the front roller means being received within the intermediate portion of the channel member to raise and lower the forward ends of the channel member and the closure member during longitudinal movement of the closure member between the second position and a partially open position forward thereof, and the pivotal connection between the forward ends of the closure member and channel member being located above the adjacent confines of the vehicle body when the closure member is in the partially open position to permit pivotal closure member movement about this connection between the partially open position and a fully open position and thereby allowing access to the compartment opening.

4. The combination of claim 3 wherein the closure member and vehicle body include respective locking members that are slidingly engaged during the rearward translation of the closure member to closed position to prevent upward opening movement of the closure member from closed position.

5. The combination of claim 3 wherein the channel member includes an abruptly curved portion through which one of the roller means passes just prior to the forwardly moving closure member reaching the partially open position to selectively maintain the channel member against rearward movement during pivoting of the closure member between the partially and fully open positions.

* * * * *